United States Patent
Cross (10) Patent No.: US 9,510,603 B2
(45) Date of Patent: Dec. 6, 2016

(54) CEPHALOPOD FILLETING AND CLEANING APPARATUS

(71) Applicant: CROSSFORD ENTERPRISES PTY LTD, South Australia (AU)

(72) Inventor: Rodney Cross, South Australia (AU)

(73) Assignee: CROSSFORD ENTERPRISES PY LTD, Blackwood (AU)

( * ) Notice: Subject to any disclaimer, the term of this patent is extended or adjusted under 35 U.S.C. 154(b) by 0 days.

(21) Appl. No.: 14/649,315

(22) PCT Filed: Nov. 12, 2013

(86) PCT No.: PCT/AU2013/001305
§ 371 (c)(1),
(2) Date: Jun. 3, 2015

(87) PCT Pub. No.: WO2014/085844
PCT Pub. Date: Jun. 12, 2014

(65) Prior Publication Data
US 2015/0296815 A1    Oct. 22, 2015

(30) Foreign Application Priority Data
Dec. 4, 2012    (AU) .................................. 2012905269

(51) Int. Cl.
*A22C 29/00*    (2006.01)
*A22C 25/00*    (2006.01)
(Continued)

(52) U.S. Cl.
CPC ........... *A22C 25/003* (2013.01); *A22C 25/006* (2013.01); *A22C 25/145* (2013.01); *A22C 25/185* (2013.01)

(58) Field of Classification Search
CPC ........ A22C 29/00; A22C 29/043; A22C 29/04
(Continued)

(56) References Cited

U.S. PATENT DOCUMENTS 1,706,403 A * 3/1929 Huot .................... A22C 25/025
452/105
1,726,326 A * 8/1929 Wallace ............... A22C 25/025
30/353
(Continued)

FOREIGN PATENT DOCUMENTS

JP    2002186412    7/2002
JP    2003-093023    4/2003

*Primary Examiner* — Richard Price, Jr.
(74) *Attorney, Agent, or Firm* — Defillo & Associates, Inc; Evelyn A. Defillo (57) ABSTRACT

There is provided an apparatus and method of filleting and cleaning a cephalopod, including squid. The apparatus for use in filleting a cephalopod including, a body having a first end being shaped for insertion into a cavity of a mantle of the cephalopod and a second end graspable by a user, a cutting member located at, or adjacent, the first end, for severing an internal membrane of the cephalopod, a guide located adjacent the cutting member, wherein upon insertion of the first end in through an opening of the mantle, the guide acts to constrain the movement of the cutting member such that it is directed along a junction between the internal membrane and an inner surface of the mantle, to thereby detach the internal membrane therefrom, wherein the mantle is inhibited from being perforated by the cutting member.

14 Claims, 9 Drawing Sheets

(51) Int. Cl.
*A22C 25/18* (2006.01)
*A22C 25/14* (2006.01)

(58) Field of Classification Search
USPC .............................. 452/1–6, 9, 102–105, 18
See application file for complete search history.

(56) References Cited

U.S. PATENT DOCUMENTS

| | | | | |
|---|---|---|---|---|
| 2,279,139 | A | * | 4/1942 | Johnson ............... A22C 25/025 452/103 |
| 3,048,884 | A | * | 8/1962 | Robichaux ........... A22C 25/025 452/105 |
| 4,432,117 | A | * | 2/1984 | Iskiw ..................... A22C 25/02 30/169 |
| 4,797,974 | A | * | 1/1989 | Smith, Jr. ............... A22C 25/06 294/25 |
| 4,920,612 | A | * | 5/1990 | Moore ..................... B26B 3/00 30/353 |
| 7,179,162 | B1 | * | 2/2007 | Twiner ................. A22C 25/025 452/105 |

* cited by examiner

*Figure 13b*

CEPHALOPOD FILLETING AND CLEANING APPARATUS

CROSS REFERENCE TO RELATED APPLICATION

This application is a national stage entry of PCT/AU2013/001305 filed Nov. 12, 2013, under the International Convention claiming priority over Australian Patent Application No. 2012905269 filed Dec. 4, 2012.

FIELD OF THE INVENTION

The present invention relates generally to filleting cephalopods used for human consumption and in particular to a method and apparatus for filleting squid.

BACKGROUND OF THE INVENTION

Cephalopods are found throughout the world's oceans and are characterized by bilateral body symmetry, a prominent head, and a set of arms or tentacles. Squid, cuttlefish and octopus are the most commonly known members of this class of sea creatures.

Most cephalopods have the ability to expel a cloud of dark ink that is used to confuse predators. The ink is contained within a muscular sac connected to the animal's anus at the open end of a blind-ended funnel or mantle used for propulsion. When alarmed or under threat the animal expels the ink out through its anus and due its the proximity to the open end of the mantle the ink is distributed out into the water column as the cephalopod propels itself away from danger.

The ejected cloud of ink forms a thick cloud, resulting in visual impairment of a predator, similar to a smokescreen. The ink may also form a decoy to confuse a predator as the cephalopod retreats.

A number of species of cephalopods, such as calamari, are popular food sources in many countries. Species targeted for food include the southern calamari (*Sepioteuthis australis*), northern calamari (*Sepioteuthis lessoniana*) and Caribbean reef squid (*Sepioteuthis sepioidea*). Calamari are easily recognizable by their large rounded fins that extend along the length of the mantle.

Commercial and recreational fishermen target several types of cephalopods, with calamari making up a significant proportion of the catch. It has been found that this type of seafood is difficult to fillet and clean because the ink sac is easily ruptured resulting in the thick viscous ink coating the mantle and hands of the person cleaning the seafood. Many recreational fishermen who attempt to clean a squid remove the head without severing the connecting tissue or membrane between the internal organs and the mantle. This results in the rupturing of the ink sac which makes cleaning much more difficult and time consuming. It is advisable the turn the mantle inside out to thoroughly clean the seafood, however this can be a difficult task because of the slimy texture of the squid's body.

Commercial machines for cleaning calamari caught in the fishing trade have been developed. However there is, to the Applicant's knowledge, no handheld device that is currently used to assist in the filleting and cleaning of cephalopods, such as calamari.

It should be appreciated that any discussion of the prior art throughout the specification is included solely for the purpose of providing a context for the present invention and should in no way be considered as an admission that such prior art was widely known or formed part of the common general knowledge in the field as it existed before the priority date of the application.

The reader should appreciate that the term cephalopods, squid, calamari and seafood may be substituted throughout the specification and are not intended to limit the scope of the invention.

SUMMARY OF THE INVENTION

In one aspect of the invention, but not necessarily the broadest or only aspect, there is proposed an apparatus used for filleting a cephalopod including, a generally planar body having a first end being shaped for insertion into a cavity of a mantle of said cephalopod and a second end graspable by a user, a forwardly facing cutting member located at, or adjacent, said first end, for severing an internal membrane of said cephalopod, said cutting member intermediate of spaced apart first and second guide portions, wherein upon insertion of said first end in through an opening of said mantle, the first and second guide portions act to constrain the movement of the cutting member such that it is directed along or adjacent a junction between said internal membrane and an inner surface of said mantle, to thereby detach the internal membrane there from, wherein at least a part of said first and/or second guide portions extend forward of said cutting member to inhibit the mantle or internal organs of the cephalopod from being perforated or ruptured by said cutting member.

The internal membrane generally encloses the internal organs, including an ink containing sac, of said cephalopod, whereby the severing of the internal membrane along, or adjacent, the junction with the inner surface of the mantle facilitates the removal of the internal organs by a user, while inhibiting the rupturing of said ink sac. The membrane is attached within the mantle generally along a ridge that extends from the opening of the mantle towards a blind end of the mantle.

The first end is shaped so as to inhibit the perforation of said mantle or internal organs of the cephalopod.

The cutting member may comprise at least one cutting face or blade, and in one form the cutting member may be a V-shaped slot in the first end having obliquely opposing cutting faces or blades. The obliquely opposing cutting faces or blades can therefore be positioned such that they extend to either side of said ridge within the mantle. In another form the cutting member may be a single slanting face or a curved surface between the first and second guide portions. Alternatively the cutting face may be a serrated or irregular blade.

The body may include an outer membrane severing member being a slot that extends into or through the body or is a protrusion on the body, wherein the outer membrane severing member may be used to sever the outer membrane at the blind end of the mantle. In one form a first apparatus is positioned within the mantle and a second apparatus is positionable over the tapered blind end of the mantle such that the outer membrane severing slot is aligned with the tapered end, whereby a tip of the tapered blind end can be passed through said slot to thereby sever the outer membrane. The user can then grasp the free end/s of the outer membrane and peel it off the outside of the mantle.

The apparatus may also be used to remove the squid's pen during filleting. The pen is a feather-shaped internal structure that supports the squid's mantle and serves as a site for muscle attachment. In one form a first apparatus is inserted into the mantle to incise the inner membrane to detach and remove the internal organs of the cephalopod. Then, while the first apparatus is still within the mantle a second apparatus is inserted between the pen and the inner surface of the mantle to detach the pen to assist in its removal. Alternatively, the apparatus may be inserted between the mantle and the pen to facilitate the removal of the internal organs and pen in a single action, or a user can simply remove the pen by inserting their index finger behind the pen to separate it from the mantle.

The body of the apparatus may include recesses in opposite sides to provide graspable portions for the users digits. Each recess may comprise a single curved indent or multiple curved indents on either side of the body. Alternatively, raised portions may be formed on, or attached to opposite sides of the body to form the graspable portion. The raised portion in one form may be constructed from a rubberized material.

The first end may include indentations in opposite sides wherein the mantle adjacent said blind end is held against the indentations by the users digits when the outer membrane is being removed, thereby inhibiting the first end from being forced through the blind end of the mantle.

Preferably, the apparatus includes a second end that is configured such that it can be rested or supported on a surface to assist with the filleting and cleaning of the cephalopod. The second end may be a generally squared off edge of the body whereby the apparatus can be supported in the upright position on a firm surface to enable the user to fillet the cephalopod.

In another form the second end may be enlarged or extendable to provide a broader base on which the apparatus can be supported in the upright position. The body may include a stand formed on, or attached to the second end. Alternatively, the stand may comprise legs, being either fixed or flexible, which are attached to or form part of the second end. In one form the second end includes two legs that can be splayed apart when the apparatus is supported in the upright.

The apparatus can be inserted, at least partially, into the mantle of the cephalopod and therefore the first end of the body may have a thickness to width ratio of at least 1:10, however other ratios are possible. The body is generally tapered toward a leading edge of the apparatus so that it conforms generally to the shape of the squid's mantle. The body may be moulded or otherwise formed in other configuration to assist with the insertion into the mantle.

Preferably, the first and second guide portions include respective leading ends having a grip member that has a textures or uneven surface, wherein the respective leading ends are configured to frictionally engage with an outer surface of a tip of the mantle without severing said mantle, to assist with the inverting of the mantle over said first end of the apparatus.

There may be various sized apparatus that can be used for different sized cephalopods or a range thereof. Generally there may be a first sized apparatus for smaller squid, a second sized apparatus for medium sized squid and a third sized apparatus for larger squid. In one form the first sized apparatus is around 180 mm long, the second sized apparatus is around 220 mm long and the third sized apparatus is around 300 mm. Different sized apparatus may also be used for different species of cephalopods In another form the body of the apparatus is telescopic or otherwise extendable to enable the length of the apparatus to be extended depending upon the size of the seafood caught. The apparatus may include a removable handle for extending the overall length, or may comprise at least two segments that are adjustable, movable or attachable to thereby extend the length of the apparatus.

The apparatus may be constructed from PVC, aluminum, stainless steel or any other type of material that provides a degree of rigidity while inhibiting damage caused by salt water and ultraviolet rays. The apparatus may be constructed from a uniform piece of material or may be blow moulded, and may be buoyant.

In one form the handheld apparatus comprises a generally flat body.

Alternatively the apparatus may comprise a length of wire bent to form the first and second ends, and the graspable portion.

In another aspect of the invention there is provided a kit including at least a first sized handheld apparatus for use in the filleting of a cephalopod of a first size range and a second sized handheld apparatus for use in the filleting of a cephalopod of a second size range.

The first and second handheld apparatus may be flexibly connected by a chain or cable, or hingedly connected so that a user can utilize the appropriately sized apparatus or the body may include an aperture whereby the apparatus can be hung on a hook when not in use In still another aspect of the invention there is provided a method of filleting a cephalopod, using an apparatus having a generally planar body, a cutting member located at, or adjacent, a first end of the body, and first and second guide portions located adjacent and on opposite side of said cutting member, at least a part of said first and/or second guide portions extend forward of said cutting member, including the steps of:

a user aligning the cutting member of the apparatus with a junction between an internal membrane and an inner surface of a mantle of said cephalopod;

inserting the first end of the body in through an open end of the mantle whereby the first and second guide portions constrains the movement of the cutting member such that it incises or causes said inner membrane to be detached from the inner surface of said mantle; and removing the head and internal organs of the cephalopod from within the mantle.

The above method including the further step of, removing the pen, along with, or after, the internal organs of the cephalopod.

The above method, including the further step of supporting the apparatus on a second end in a generally upright position to allow the fins and outer membrane of the cephalopod to be removed.

The above method further includes the steps of:

removing the apparatus from within the mantle;

reversing the mantle such that at grip member at said first end of the body abuts an outer surface of a mantle at said blind end;

placing the second end of the apparatus on a surface so that the apparatus is supported in a generally upright position; and applying downward pressure on the mantle to invert said mantle over the top of the apparatus, wherein the mantle is turning inside out.

The mantle can then be cleaned by the user to remove any residual membrane, remaining internal organs or muscular material.

BRIEF DESCRIPTION OF THE DRAWINGS

The accompanying drawings, which are incorporated in and constitute a part of this specification, illustrate implementations of the invention and, together with the description and claims, serve to explain the advantages and principles of the invention. In the drawings.

FIG. 6a is a top view of a second embodiment of the apparatus;

FIG. 6b is a perspective view of the apparatus of FIG. 6a;

FIG. 7b is a perspective view of the apparatus of FIG. 7a;

DETAILED DESCRIPTION OF THE ILLUSTRATED AND EXEMPLIFIED EMBODIMENTS

There are numerous specific details set forth in the following description. However, from the disclosure, it will be apparent to those skilled in the art that modifications and/or substitutions may be made without departing from the scope and spirit of the invention. In some circumstance specific details may have been omitted or enlarged so as not to obscure the invention. Similar reference characters typically indicate corresponding parts throughout the drawings.

Figure 1:
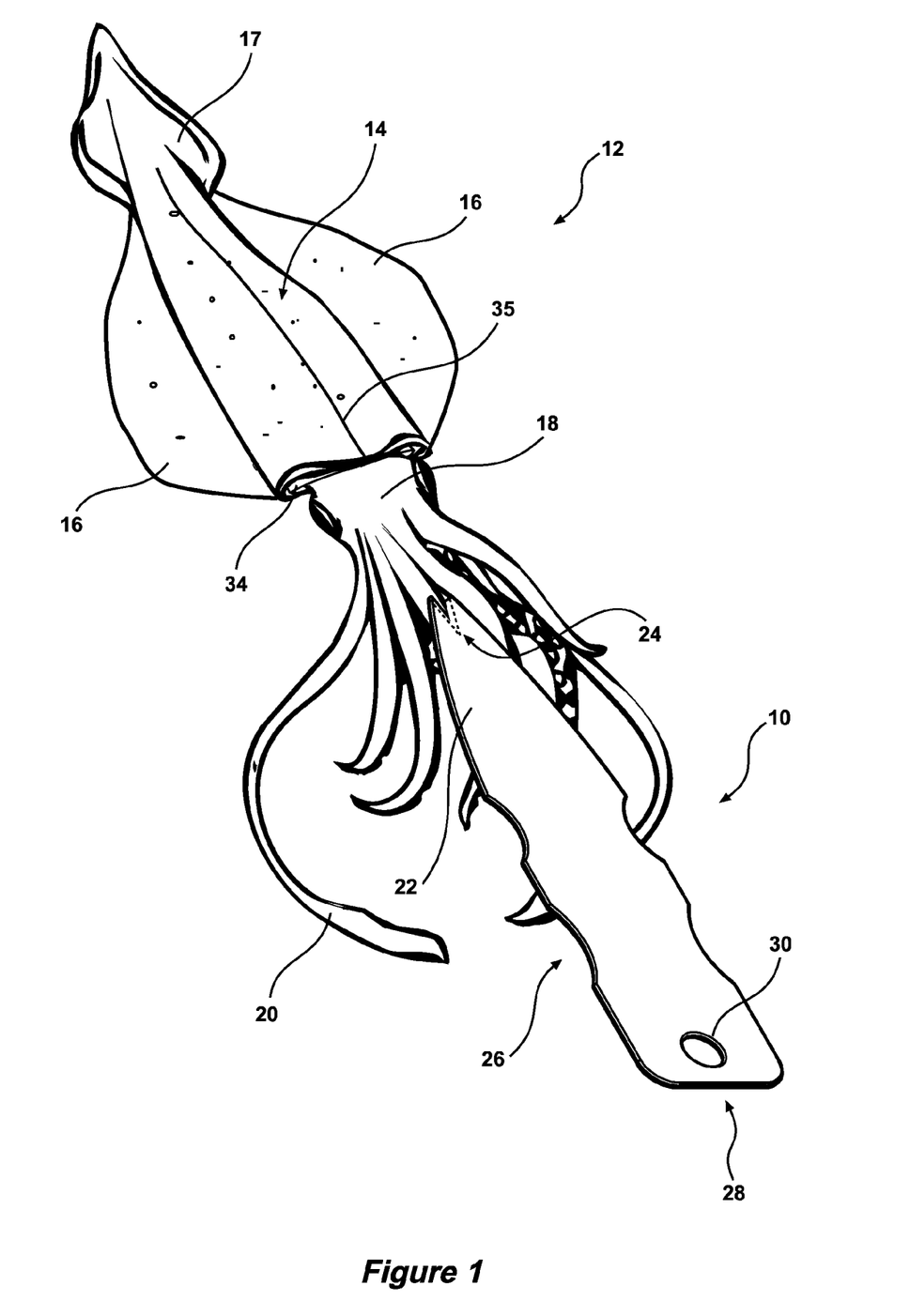
FIG. 1 is a perspective view of the apparatus of the present invention for cleaning a calamari.

Turning to the figures for a detailed explanation of the invention, there is illustrated a handheld apparatus 10 for filleting and cleaning a cephalopod 12 demonstrating by way of examples, arrangements in which the principles of the present invention may be employed. The cephalopod 12 includes a mantle 14, and fins 16 covered by an outer membrane 17, a head 18 and tentacles 20. The illustrated cephalopod 12 is a calamari or squid, however other cephalopods can be cleaned using the apparatus of the present invention without departing from the scope of the invention. As illustrated in FIG. 1 the apparatus 10 is generally planar and includes a first end 22 configured for insertion into the mantle 14. The first end 22 includes a cutting member 24 for severing a membrane that attaches the head 18 and internal organs to the inner surface of the mantle 14. The apparatus 10 further includes a graspable portion 26 for assisting a user in moving the apparatus 10 to fillet the squid 12.

The handheld apparatus 10 is generally elongate and includes a second end 28 that can be rested upon a surface to assist with the filleting and cleaning of the squid 12. An aperture 30 is located adjacent the second end 28 and can be used to secure a cable there through or can be used to hang the apparatus 10 on a hook when not in use.

Figures 2, 3, 4:
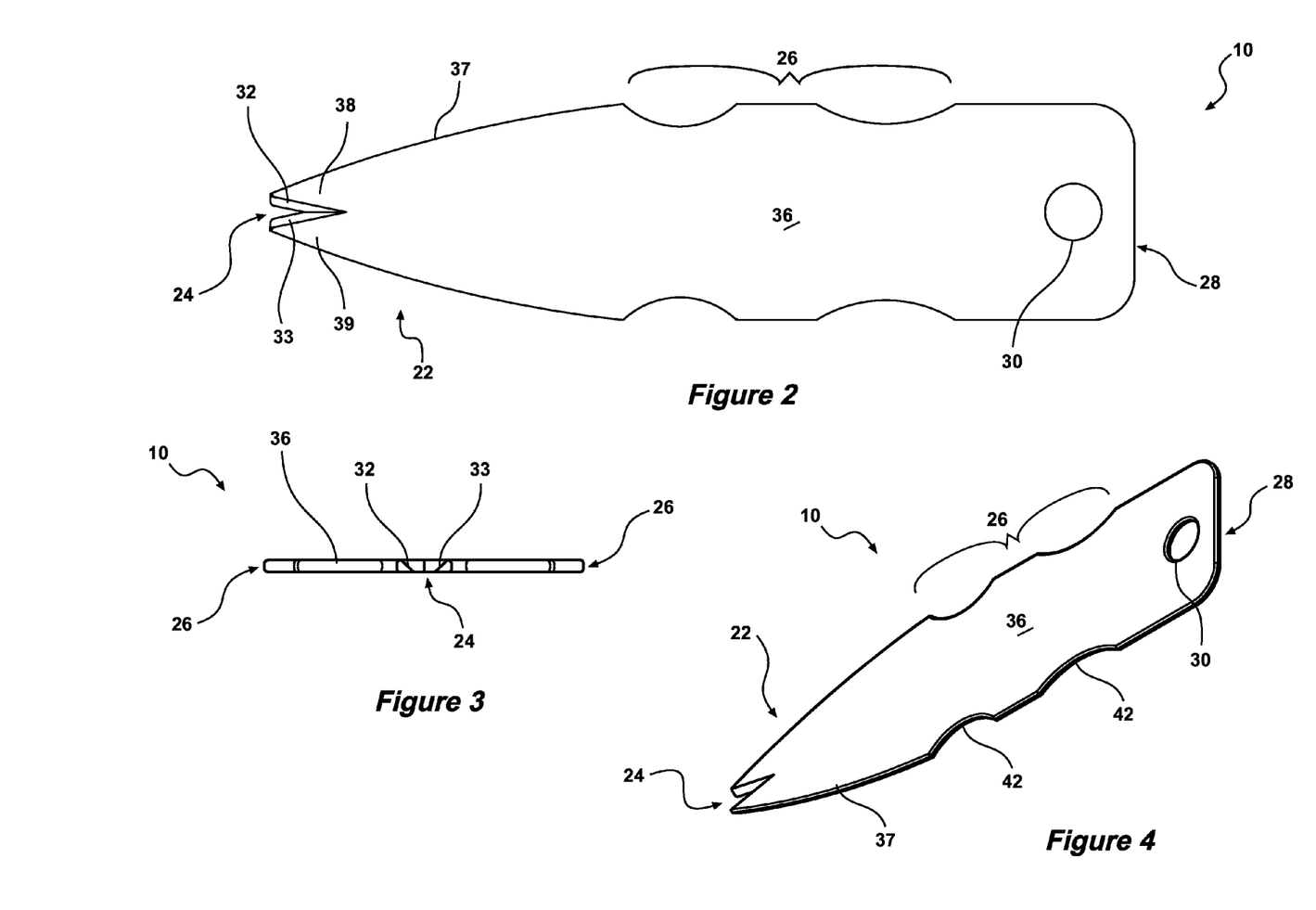
FIG. 2 is a top view of the apparatus of FIG. 1.
FIG. 3 is an end view of the apparatus of FIG. 1.
FIG. 4 is a perspective view of the apparatus of FIG. 1 illustrating the cutting face.

As illustrated in FIG. 2, the cutting member 24 may comprise a V-shaped slot in the first end 22 having obliquely opposing cutting faces 32, 33. The junction between the internal membrane 34 and the inside of the mantle 14 along central ridge 35 can be positioned within the V-shaped slot to facilitate severing of the internal membrane.

As further illustrated in FIGS. 3 and 4, the apparatus 10 comprises a generally flat body 36 wherein the thickness of the body 36 permits at least the first end 22 of the apparatus 10 to be inserted into the mantle 14.

The outer sides 37 of the body 36 are generally smooth such that they do not sever the mantle of the squid during use. The guide 38 comprises guide portions 39, 40 that are configured to guide the cutting edge such that it severs the membrane from the internal surface of the mantle.

In the present embodiment the graspable portion 26 comprises recesses 42 in opposite sides of the body 36 to provide graspable portions for the user's digits.

The second end 28 may be a generally squared off edge of the body 36 whereby the apparatus 10 can be supported in the upright position on a firm surface to assist the user in filleting the squid 12.

Figure 5A:
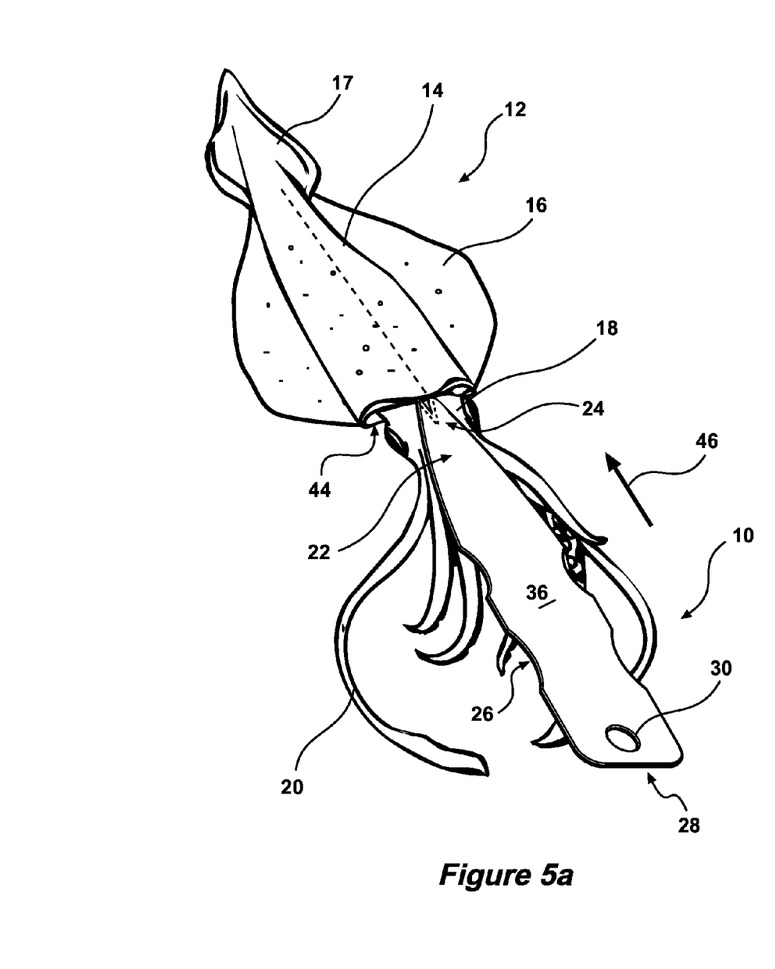
FIG. 5a is a perspective view of the apparatus of FIG. 1 being inserted into the open end of the mantle of the calamari.

In use, as illustrated in FIGS. 5a to 5e, the apparatus 10 is aligned with the inner membrane 34, which is generally attached to the inside of the mantle 14 along the illustrated broken line that corresponds to the central ridge 35. It should however be appreciated that the membrane may be attached or fused to the mantle either side of the central ridge 35 or at multiple locations thereabout. Accordingly, the body is tapered outwardly from the cutting member such that the sides of the body impinge upon these secondary sites of attachment to separate them from the inner surface of the mantle. The membrane secures the internal organs and head of the squid to the inner surface of the mantle 14. The apparatus 10 is inserted in through opening 44 of the mantle 14 in the direction of arrow 46, as illustrated in FIG. 5a. The reader should also appreciate that the planar apparatus can be inserted between the mantle and pen of the cephalopod to detach the membrane from the inner surface of the mantle to thereby enable a user to remove the pen and internal organs in a single action.

Figure 5B:
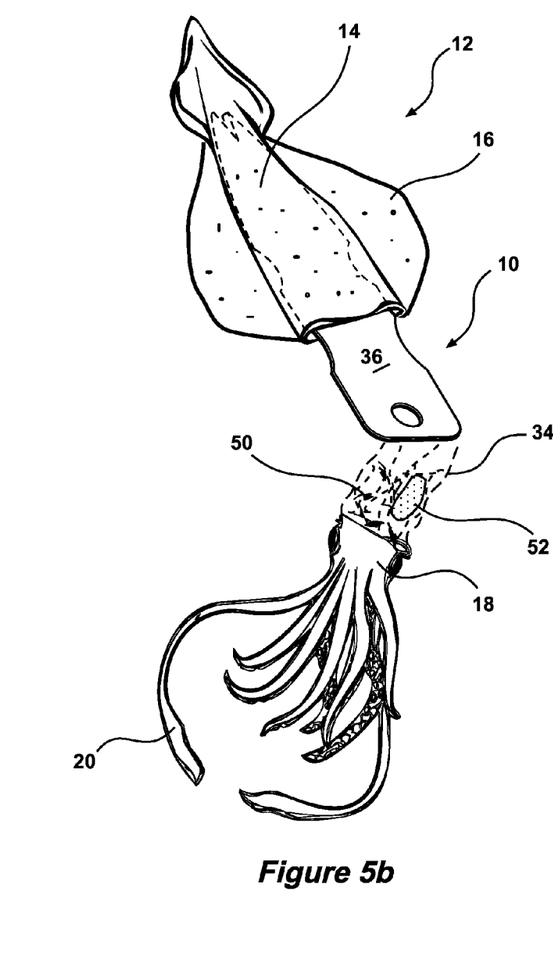
FIG. 5b is a perspective view of the apparatus of FIG. 5a illustrating the head and internal organs of the calamari being removed.

Once the membrane 34 has been separated from the internal surface of the mantle 14, the internal organs 50, head 18 and tentacles 20 can be removed by the user, as illustrated in FIG. 5b. Since the inner membrane 34 is generally intact the internal organs 50, including the ink sac 52, are not ruptured. This reduces the potential for leakage of ink and other bodily fluids into the cavity of the mantle 14, which would increase the difficulty of cleaning.

While the first end 22 is positioned within the mantle 14 the apparatus 10 can be supported in an upright position by placing the second end 28 on a firm surface. The fins 16 and outer membrane 17 of the squid 12 can then be removed by the user an indicated by FIG. 5c while the apparatus is supported on second end 28.

Figure 5C:
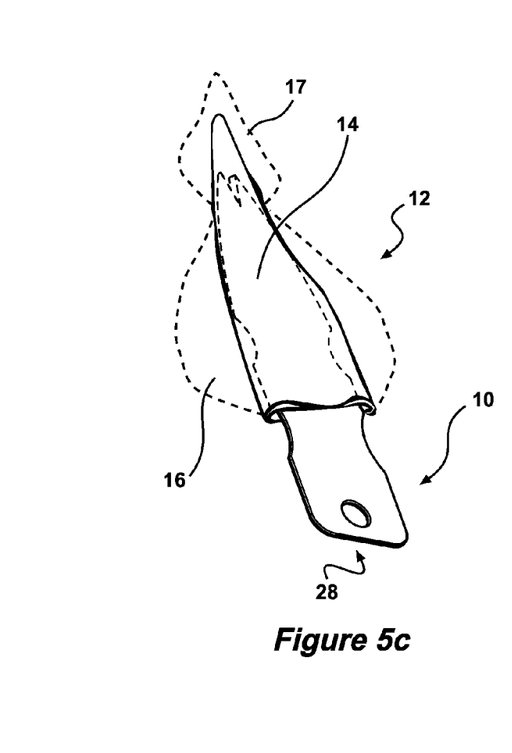
FIG. 5c is a perspective view of the apparatus of FIG. 5a illustrating the fins and outer membrane of the calamari being removed.
Figure 5D:
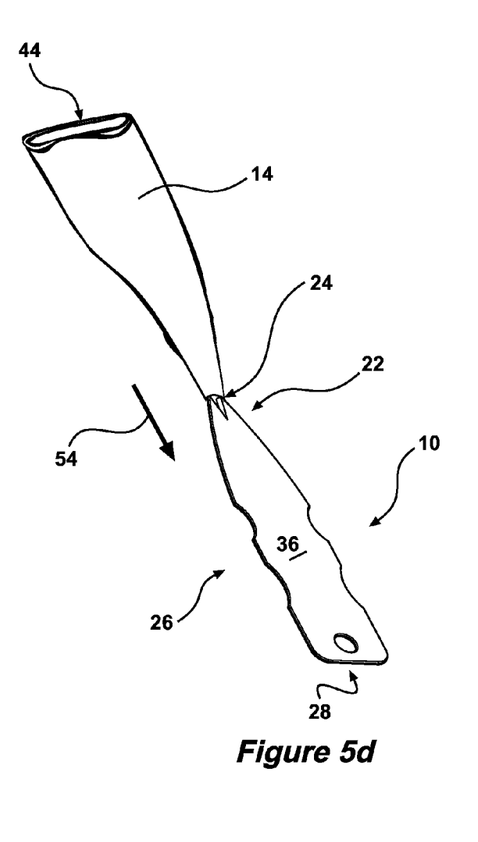
FIG. 5d is a perspective view of the apparatus of FIG. 5a illustrating the mantle being reversed.

Once the outer membrane 17 and fins 16 have been detached the apparatus 10 is removed from within the mantle 14, which is then reversed such that guide 38 abuts the blind end 54 of the mantle 14, as illustrated in FIG. 5d. At this stage the mantle 14 is typically referred to as a tube.

Figure 5E:
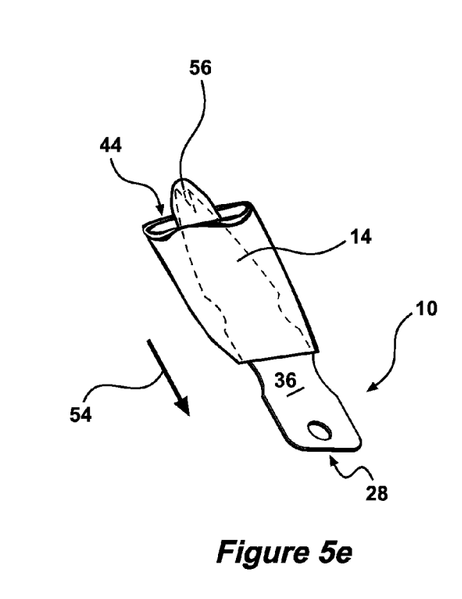
FIG. 5e is a perspective view of the apparatus of FIG. 5a illustrating the mantle being inverted over the apparatus.

While the second end 28 is supported on a firm surface, downward pressure is applied to the mantle or tube 14 so that it slides down over the top of the first end 22, in the direction of arrow 54 as further illustrated in FIG. 5d. The tube 14 continues to be moved in the direction of arrow 54, as illustrated in FIG. 5e, until the tube is fully invert over the apparatus. This means that the mantle is turning inside out thereby exposing the internal surface 56 of the mantle 14. The inside of the mantle can then be easily cleaned to remove any residual membrane, remaining internal organs or muscular material.

Figures 6A, 6B:
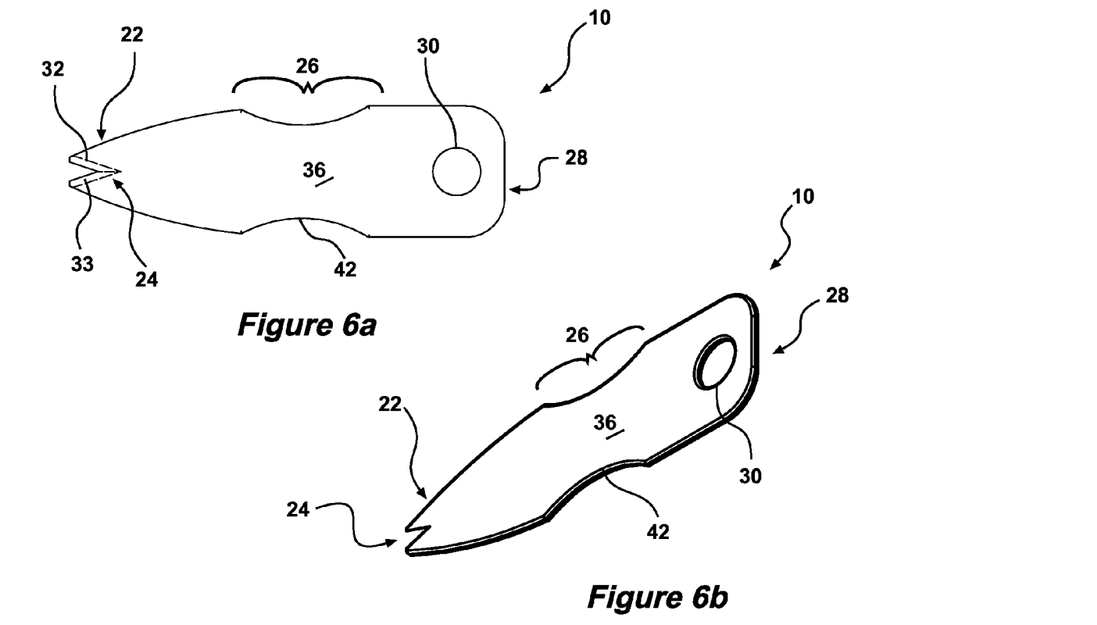
Figure 7A:
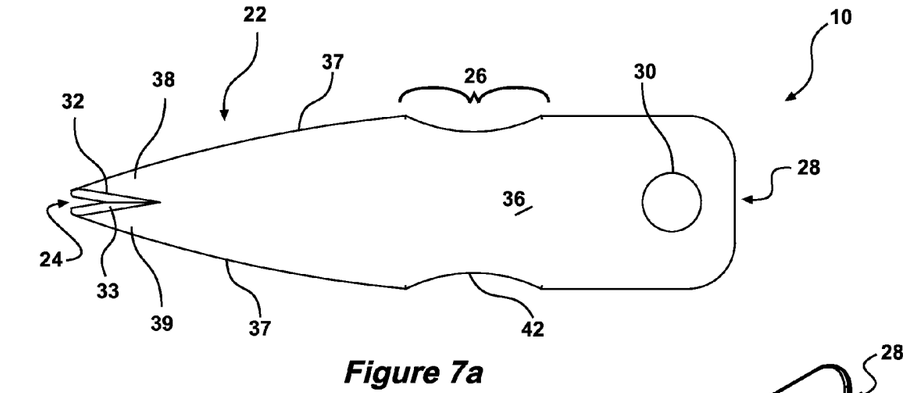
FIG. 7a is a top view of a third embodiment of the apparatus.
Figure 7B:
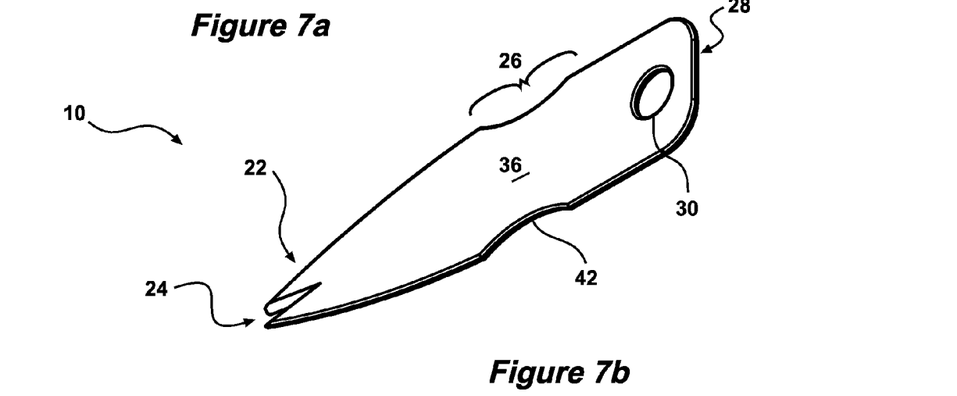

The apparatus 10 can be produced in a range of different sizes, as illustrated in FIGS. 6a to 7b, which can be used for different sized squid or different size ranges of squid. For instance a first sized apparatus, as illustrated in FIGS. 6a and 6b may be used for smaller squid. While a second sized apparatus 10, as illustrated in FIGS. 7a and 7b, may be used for medium sized squid. The third sized apparatus for larger squid has been previously illustrated in FIG. 1. In one embodiment the first sized apparatus is around 180 mm long, the second sized apparatus is around 220 mm long and the third sized apparatus is around 300 mm. The apparatus may also have different dimensions so that they are be used on different species of cephalopods. For instance a broader shorter apparatus may be produced for use on cuttlefish or other types of squid.

Figure 8:
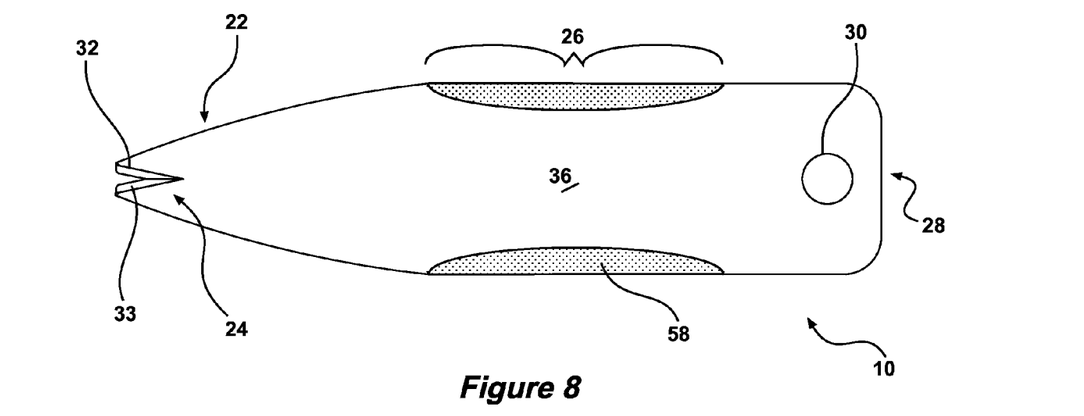
FIG. 8 is a top view of a fourth embodiment of the apparatus, illustrating an alternative graspable portion.

In another embodiment, as illustrated in FIG. 8, the graspable portion 26 includes raised members 58 formed on, or attached to opposite sides of the body 36. The raised members 58 may be constructed from a rubberized material to assist the user in grasping the apparatus 10.

Figures 9, 10:
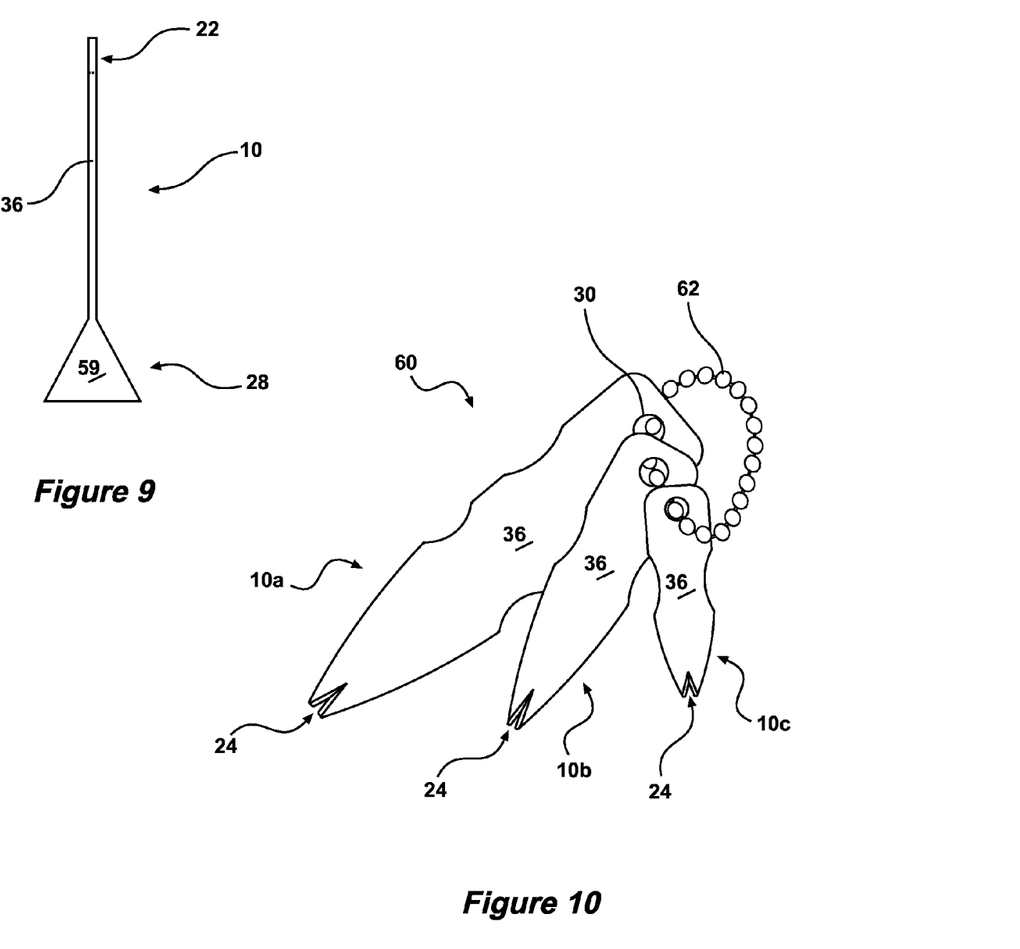
FIG. 9 is a side view of a fifth embodiment of the apparatus, illustrating an enlarged second end.
FIG. 10 is a perspective view of a kit including three different sized
apparatus for use on different sized calamari.

In another embodiment, as illustrated in FIG. 9, the second end 28 may be enlarged 59 to provide a broader base on which the apparatus 10 can be support in the upright position. Alternatively, although not illustrated, the second end may be extendable and include legs that can be splayed apart when the apparatus 10 is supported in the upright.

As illustrated in FIG. 10, the invention may comprise a kit 60 including a first sized handheld apparatus 10a for use in the filleting of a cephalopod of a first size range, a second sized handheld apparatus 10b for use in the filleting of a cephalopod of a second size range, and a third sized handheld apparatus 10c for use in the filleting of a cephalopod of a third size range. The first, second and third apparatus may be flexibly connected by a chain 62 so that a user can utilize the appropriately sized apparatus.

Figure 11:
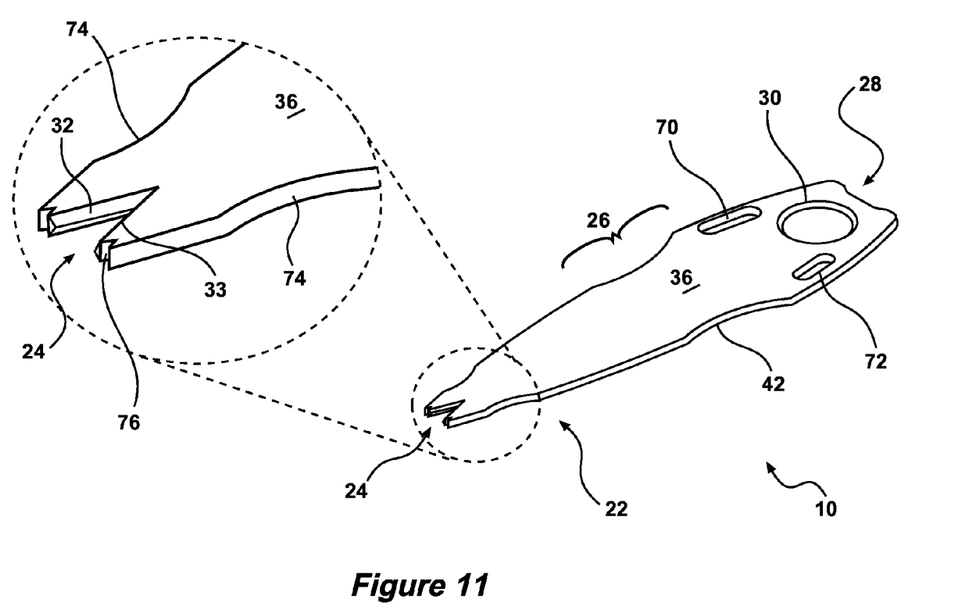
FIG. 11 is a perspective view of a sixth embodiment, illustrating the notched guide members and outer membrane severing slots.

Turning to FIG. 11 there is illustrated a sixth embodiment of the apparatus 10 that includes outer membrane severing slots 70, 72. The slots are used to sever the outer membrane 17 as will be discussed with respect to FIG. 13a. FIG. 11 further illustrates indentations 74 in opposite sides of the body 36 that are used to support the end of the mantle 14 when removing the outer membrane 17.

The first and second guide members 39 and 40 include a respective grip member in the form of a notch 76 in the leading end such that during use the guide can engage with the surface of the mantle 14 when it is being inverted over the apparatus, as previously illustrated in FIGS. 5c to 5e, without slipping.

Figure 12:
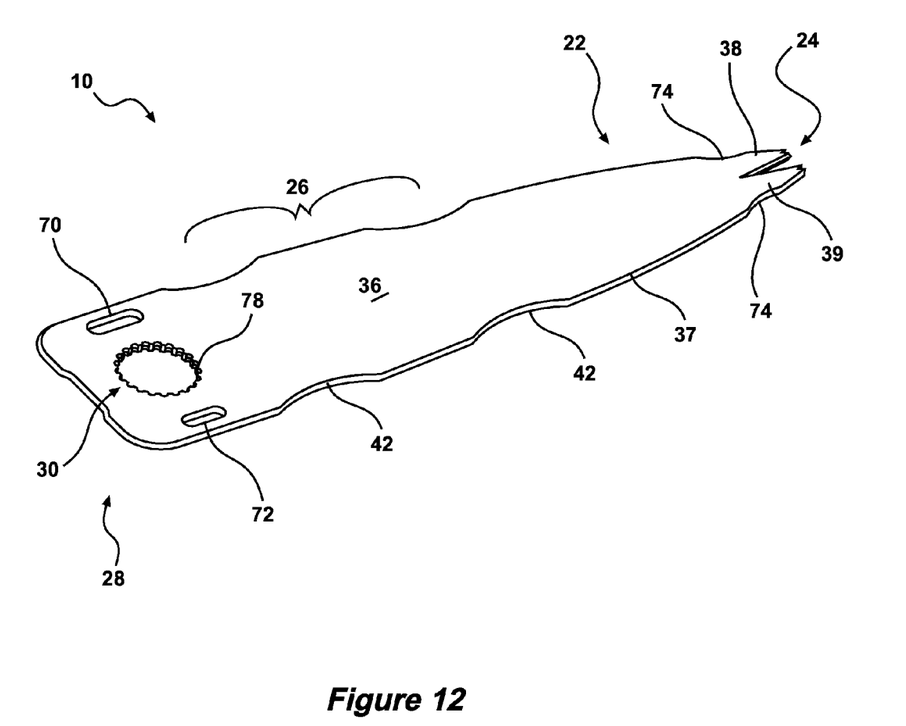
FIG. 12 is a perspective view of a larger apparatus of the sixth embodiment.

In one possible embodiment, as illustrated in FIG. 12 the aperture 30 may include circumferential ridges 78 that can be used to remove a bottle cap.

Figures 13A, 13B:
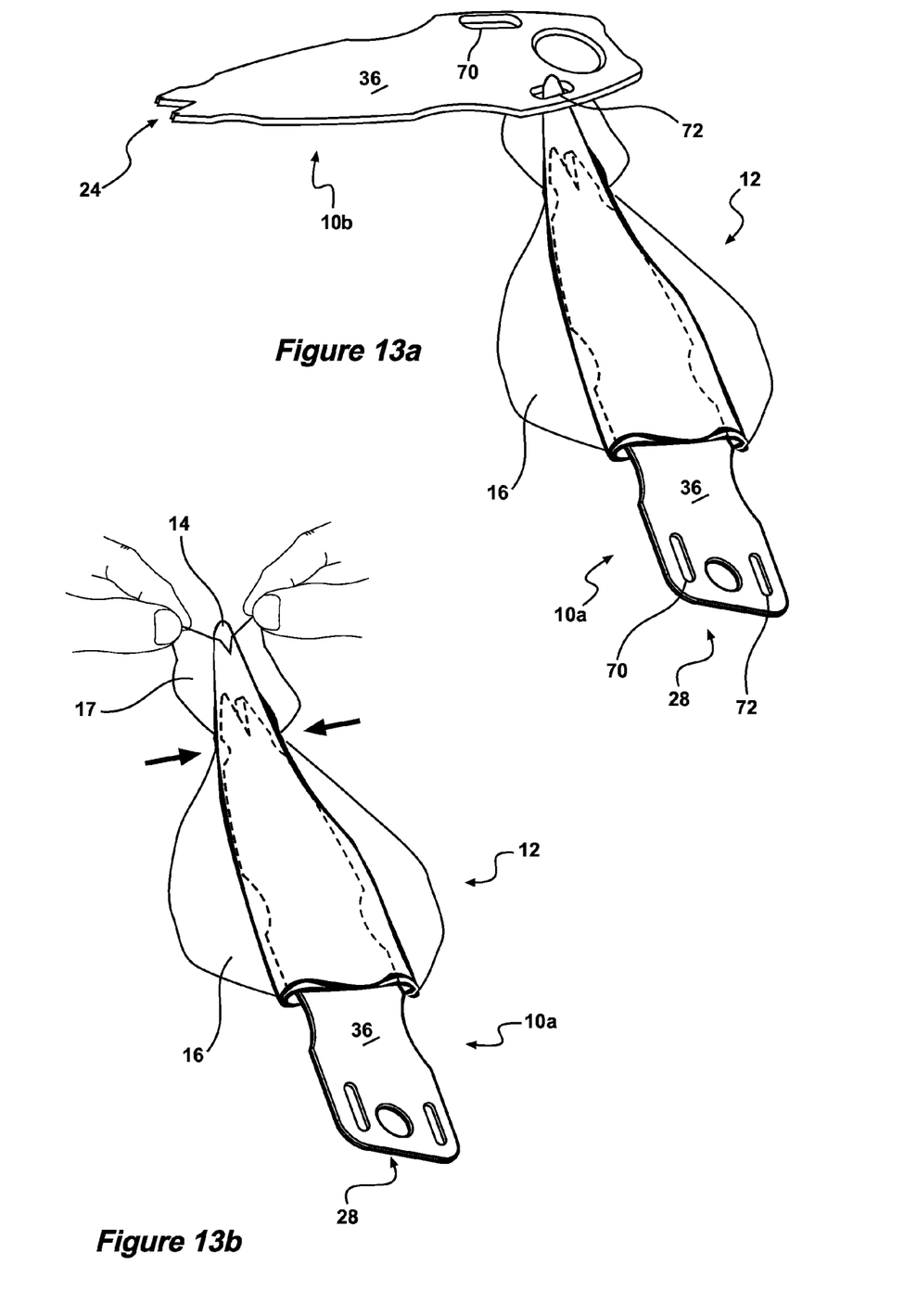
FIG. 13a is a perspective view of the apparatus of FIG. 11 being used to sever the membrane.
FIG. 13b is a perspective view of a user removing the membrane of the calamari.

As illustrated in FIGS. 13a to 13b, two apparatus 10a and 10b can be used during the cleaning of the squid to remove the outer membrane 17. As illustrated in FIG. 13a, slot 72 can be positioned over the tapered blind end of the mantle 14 such that the tapered blind end of the mantle 14 is pushed through the slot 72 thereby severing the outer membrane 17. The user can then grasp the free ends of the outer membrane 17, as illustrated in FIG. 13b and peal it off the mantle 14. The user may also hold the end of the mantle 14 against the indentations 74, as indicated by arrows to inhibit the first end 22 of the apparatus 10 from pushing through the mantle 14 while the outer membrane 17 is being removed.

Figure 14:
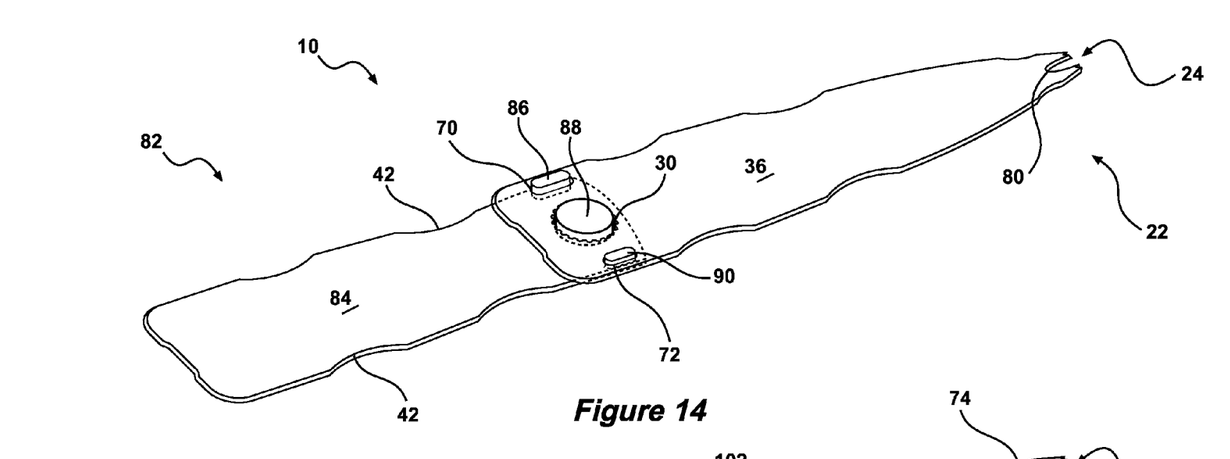
FIG. 14 is a perspective view of a seventh embodiment illustrating a removable handle.

In another embodiment, as illustrated in FIG. 14, the cutting member 24 may include a curved face 80 that is intermediate of first and second guide portions 39, 40.

As further illustrated in FIG. 14, the apparatus 10 includes a detachable handle 82, including a graspable portion having respective recesses 42, the handle further includes projections 86, 88 and 90 that are configured to cooperate with aperture 30 and slots 70, 72, of body 36. In this way the overall length of the apparatus 10 can be modified to allow it to be used on different sized cephalopods.

Figure 15:
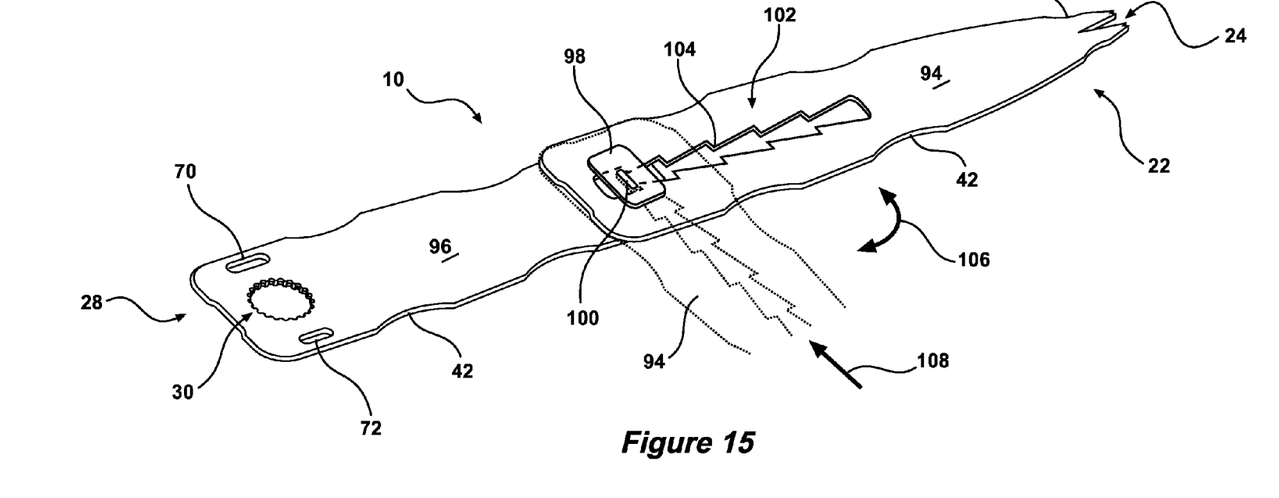
FIG. 15 is a perspective view of an eighth embodiment illustrating an adjustable apparatus.

In still another embodiment, as illustrated in FIG. 15, the apparatus 10 includes first and second cooperating segments 94, 96 that are movable relative to each other, to thereby extend the overall length of the apparatus 10. The segment 96 has a laterally elongate projection 98 extending from a top side, and a cover plate 100 attached thereto. The projection 98 engages through channel 102 that includes opposing teeth 104, and is held in place by the cover plate 100. To shorten the overall length of the apparatus 10 the segment 94 is pivoted by 90° as indicated by arrow 106 and then moved in the direct of arrow 108. The segment 94 is then rotated back in the opposite direction as indicated by arrow 106 to maintain the length during use. To lengthen the apparatus 10, the segment 94 is moved in the opposite direction of arrow 108.

The reader will appreciate that the apparatus 10 may be telescopic or otherwise extendable to enable the apparatus to be lengthened depending upon the size of the cephalopod being filleted.

The skilled addressee will now appreciate that the illustrated invention provides a filleting apparatus 10, which has benefits over the prior art. The apparatus provides a means for filleting and cleaning a cephalopod, such as a squid, while inhibiting the rupture of the ink sac or other internal organs, which would otherwise increase the difficulty in cleaning the seafood. The apparatus assists with the removal of the internal organs and provides a support for both the removal of the fins and outer membrane, as well as a support for inverting the mantle so that the internal surface of the mantle can be further cleaned.

Various features of the invention have been particularly shown and described in connection with the exemplified embodiments of the invention, however, it must be understood that these particular arrangements merely illustrate and that the invention is not limited thereto. Accordingly the invention can include various modifications, which fall within the spirit and scope of the invention.

The claims defining the invention are as follows:

1. An apparatus used for filleting a cephalopod including,
a planar body having a first end being shaped for insertion into a cavity of a mantle of said cephalopod and a second end graspable by a user,
a forwardly facing cutting member located at, or adjacent, said first end, for severing an internal membrane of said cephalopod, wherein the cutting member comprises at least one cutting face;
said cutting member intermediate of spaced apart first and second guide portions, wherein upon insertion of said first end in through an opening of said mantle, the first and second guide portions act to constrain the movement of the cutting member such that it is directed along or adjacent a junction between said internal membrane and an inner surface of said mantle, to thereby detach the internal membrane therefrom, wherein at least a part of said first and/or second guide portions extend forward of said cutting member to inhibit the mantle or internal organs of the cephalopod from being perforated or ruptured by said cutting member.

2. The apparatus in accordance with claim 1, wherein the first and second guide portions include respective leading ends having a grip member that has a textured or uneven surface, wherein the respective grip members are configured to frictionally engage with an outer surface of a tip of the mantle without severing said mantle to assist with the inverting of the mantle over said first end of the apparatus.

3. The apparatus in accordance with claim 1, wherein the cutting member is a blade.

4. The apparatus in accordance with claim 1, wherein the body includes an outer membrane severing member, being a slot or protrusion, wherein said outer membrane severing member is used to sever an outer membrane of said cephalopod at a blind end of said mantle.

5. The apparatus in accordance with claim 4, wherein the first end includes indentations in said opposite sides wherein the mantle adjacent said blind end is held against the indentations by the user's digits when said outer membrane is being removed.

6. The apparatus in accordance with claim 1, wherein the body has an upper planar surface, a lower planar surface, and curved sides extending there between, wherein the body includes respective curved recesses in opposite sides to provide a graspable portion for the user's digits.

7. The apparatus in accordance with claim 1, wherein the second end is flat or enlarged, such that the apparatus can be rested or supported on a surface to assist with the filleting and cleaning of said cephalopod.

8. The apparatus in accordance with claim 1, wherein the body is tapered toward a leading edge of the apparatus whereby the shape of the apparatus corresponds to the shape of the mantle of said cephalopod.

9. The apparatus in accordance with claim 1, wherein the body is telescopic or otherwise extendable to permit the length of the apparatus to be altered, or includes a reversibly attachable handle for extending the length of the apparatus.

10. A kit comprising an apparatus of a first size, the apparatus used for filleting a cephalopod including, a planar body having a first end being shaped for insertion into a cavity of a mantle of said cephalopod and a second end graspable by a user, a forwardly facing cutting member located at, or adjacent, said first end, for severing an internal membrane of said cephalopod, wherein the cutting member comprises at least one cutting face, said cutting member intermediate of spaced apart first and second guide portions, wherein upon insertion of said first end in through an opening of said mantle, the first and second guide portions act to constrain the movement of the cutting member such that it is directed along or adjacent a junction between said internal membrane and an inner surface of said mantle, to thereby detach the internal membrane therefrom, wherein at least a part of said first and/or second guide portions extend forward of said cutting member to inhibit the mantle or internal organs of the cephalopod from being perforated or ruptured by said cutting member for use in the filleting of a cephalopod of a first size range and said apparatus of a second size for use in the filleting of a cephalopod of a second size range.

11. A method of filleting a cephalopod, using an apparatus having a planar body, a cutting member including at least one cutting face located at, or adjacent, a first end of the body, and a first and second guide portions located adjacent and on opposite sides of said cutting member, at least a part of said first and/or second guide portions extend forward of said cutting member including the steps of:
aligning the cutting member of said apparatus with or adjacent a junction between an internal membrane and an inner surface of a mantle of said cephalopod at an open end of the mantle;
inserting the first end of said body in through said open end of the mantle whereby the first and second guide portions constrains the movement of the cutting member such that it incises or causes said inner membrane to be detached from said mantle; and
removing the head and internal organs of the cephalopod from within the mantle.

12. The method in accordance with claim 11, further including the step of severing an outer membrane at a blind end of the mantle, using an outer membrane severing member being a slot in said body or a protrusion on said body, wherein the outer membrane severing member is used to sever the outer membrane to assist a user in removing the outer membrane from the outside of the mantle.

13. The method in accordance with claim 12, wherein a first apparatus is positioned within the mantle and a second apparatus is positionable over the tapered blind end of the mantle such that the outer membrane severing member of the second apparatus is aligned with the tapered end, whereby a tip of the tapered blind end can be passed through said slot to thereby sever the outer membrane.

14. The method in accordance with claim 11, further including the steps of:
removing the apparatus from within said mantle;
reversing the mantle such that a grip member at said first end of the body abuts an outer surface of the mantle at said blind end;
placing the second end of the apparatus on a surface so that the apparatus is supported in a generally upright position; and
applying downward pressure on the mantle to invert said mantle over the first end of the body of said apparatus, wherein the mantle is turning inside out.

* * * * *